(12) United States Patent
Stopa et al.

(10) Patent No.: US 10,331,438 B2
(45) Date of Patent: Jun. 25, 2019

(54) SOFTWARE CLASSIFICATION BASED ON CUSTOM RULES

(71) Applicant: International Business Machines Corporation, Armonk, NY (US)

(72) Inventors: Tomasz A. Stopa, Cracow (PL); Tomasz P. Zeller, Cracow (PL); Piotr P. Godowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/794,281

(22) Filed: Oct. 26, 2017

(65) Prior Publication Data

US 2019/0129711 A1   May 2, 2019

(51) Int. Cl.
  *G06F 9/44*   (2018.01)
  *G06F 8/70*   (2018.01)
  *H04L 12/24*  (2006.01)

(52) U.S. Cl.
  CPC ............... *G06F 8/70* (2013.01); *H04L 41/20* (2013.01)

(58) Field of Classification Search
  CPC .................................. G06F 8/70; H04L 41/20
  See application file for complete search history.

(56) References Cited

U.S. PATENT DOCUMENTS

| | | | |
|---|---|---|---|
| 6,785,683 B1 | 8/2004 | Zodik et al. | |
| 7,350,204 B2 | 3/2008 | Lambert et al. | |
| 2001/0013024 A1* | 8/2001 | Takahashi | G06F 21/10 705/59 |
| 2008/0092107 A1* | 4/2008 | McWilliam | G06F 8/20 717/101 |
| 2010/0070505 A1* | 3/2010 | Kao | G06F 21/604 707/740 |
| 2010/0325707 A1* | 12/2010 | Iverson | H04L 63/083 726/6 |
| 2013/0054601 A1 | 2/2013 | Whitlock et al. | |
| 2016/0125025 A1* | 5/2016 | Blanco | G06F 16/2423 707/772 |

OTHER PUBLICATIONS

IBM, "Creating and managing custom rules", IBM BigFix Inventory 9.5.0, IBM Knowledge Center, Jun. 1, 2017, <https://www.ibm.com/support/knowledgecenter/SSKLLW_9.5.0/com.ibm.bigfix.inventory.doc/Inventory/softinv/t_sc_custom_rules.html>, 2 pages.

* cited by examiner

*Primary Examiner* — Jae U Jeon
(74) *Attorney, Agent, or Firm* — Edward J. Wixted, III

(57) ABSTRACT

A scan of a computing environment produces an inventory listing of software components installed in the computing environment. A user establishes a set of filter criteria which when applied to the inventory listing, produces a filtered inventory listing. The filtered inventory listing includes only software components that should collectively be classified in a common way. Once the user indicates that the filtered listing includes only the software components that should be collectively classified in a common way, and the user has performed (applied) a classification, the system creates a rule based on the modified filter criteria and the applied classification. During subsequent scans of the computing environment, the system applies the rule automatically, to identify and classify any newly discovered instances of software components that match the filtering conditions embodied in the rule.

15 Claims, 2 Drawing Sheets

SOFTWARE CLASSIFICATION BASED ON CUSTOM RULES

BACKGROUND OF THE INVENTION

The present invention relates generally to the field of software asset and license management, and more particularly to automated classification of software components installed in a computing environment.

Software asset management (SAM) involves managing software applications within an enterprise. One aspect of SAM is ensuring adherence to licensing terms and conditions associated with the myriad of software components in an enterprise computing environment. Proper classification of the software components is instrumental in this effort. Software asset management may entail periodic scans of the constantly changing and evolving computing environment, to identify and classify software components installed therein.

SUMMARY

According to an aspect of the present invention, there is a method, computer program product and/or system for classifying software components that performs the following operations (not necessarily in the following order): (i) conducting a first classification scan based at least in part, on a first set of filter criteria, to determine a set of software components; (ii) receiving a first user input comprising a second set of filter criteria including at least one filter criterion; (iii) calculating a subset of the set of software components, based at least in part, on the second set of filter criteria; (iv) indicating the subset to a user via a user interface device; (v) receiving a second user input indicating a selected set of software components; (vi) determining that the subset and the selected set are identical sets; (vii) responsive to determining that the subset and the selected set are identical sets, generating a classification rule based, at least in part, on the second set of filter criteria, and specifying an action to be performed upon invocation of the rule; (viii) storing into a memory device, the classification rule; (ix) conducting a second classification scan to discover a newly discovered software component meeting the second set of filter criteria; and/or (x) classifying the newly discovered software component in accordance with the action specified in the classification rule.

DETAILED DESCRIPTION

Figure 1:
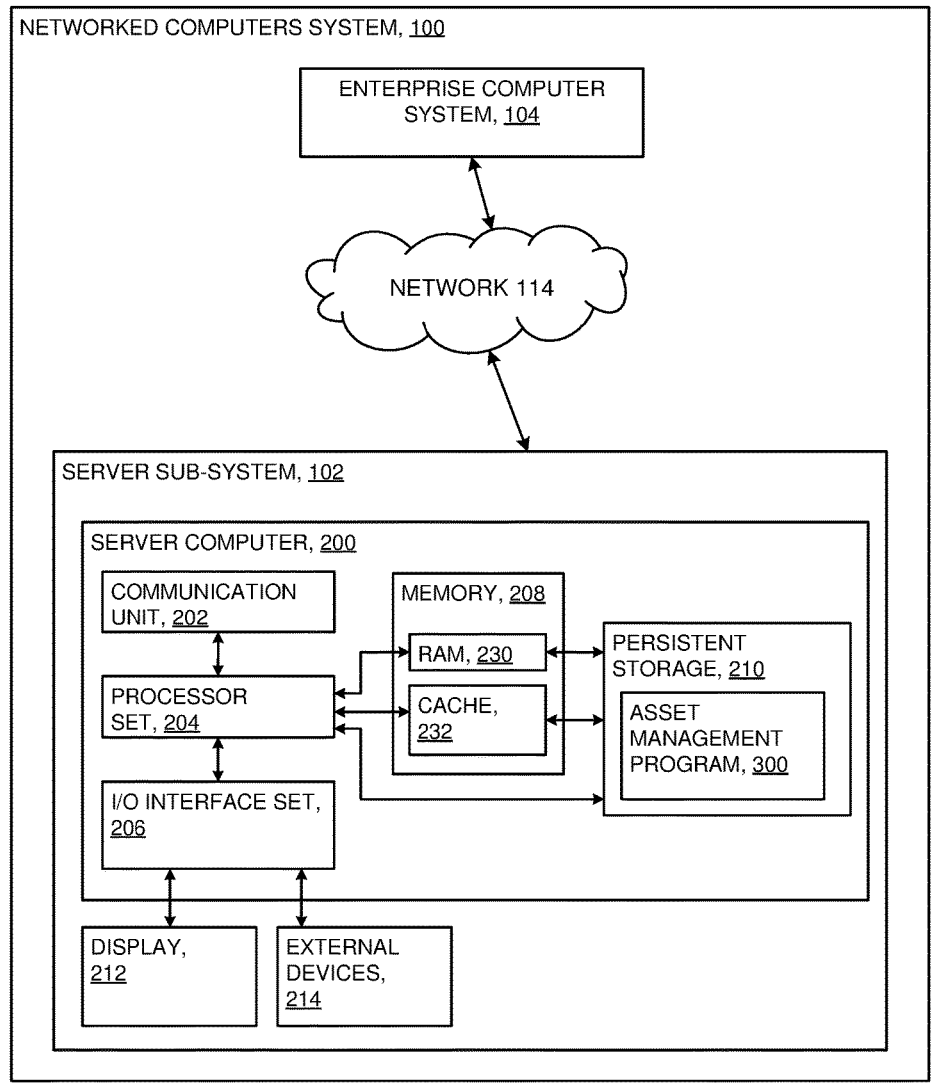
FIG. 1 is a functional block diagram showing a computing environment in accordance with at least one embodiment of the present invention.

Some embodiments of the present invention use manual user actions to classify software and establish rules which are subsequently and automatically applied in the future. A user applies filtering criteria which is applied during a scan of software components installed in a computer system. Conducting the scan produces a filtered listing of software components. The user may iteratively modify the filter criteria, such that when applied, the resultant listing includes only software components that should collectively be classified in a common way. Once the filtered listing includes only the software components that should be collectively classified in a common way, the user applies the desired classification. The system then creates a rule based on: (i) the modified filter criteria; and/or (ii) the classification method applied by the user. During subsequent scans of the computer system, the rule is applied automatically to identify and classify any newly discovered instances of software components that match the filtering conditions embodied in the rule.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; enterprise computer system 104; communication network 114; server computer 200; communication unit 202; processor set 204; input/output (I/O) interface set 206; memory device 208; persistent storage device 210; display device 212; external device set 214; random access memory (RAM) devices 230; cache memory device 232; and asset management program 300.

Server sub-system 102 is, in many respects, representative of the various computer sub-system(s) in the present invention. Accordingly, several portions of server sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Asset management program 300 is a collection of machine readable instructions and/or data that is used to create, manage and control certain software functions that will be discussed in detail, below, in the Example Embodiment sub-section of this Detailed Description section.

Server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for server sub-system 102; and/or (ii) devices external to server sub-system 102 may be able to provide memory for server sub-system 102.

Asset management program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Asset management program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, asset management program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
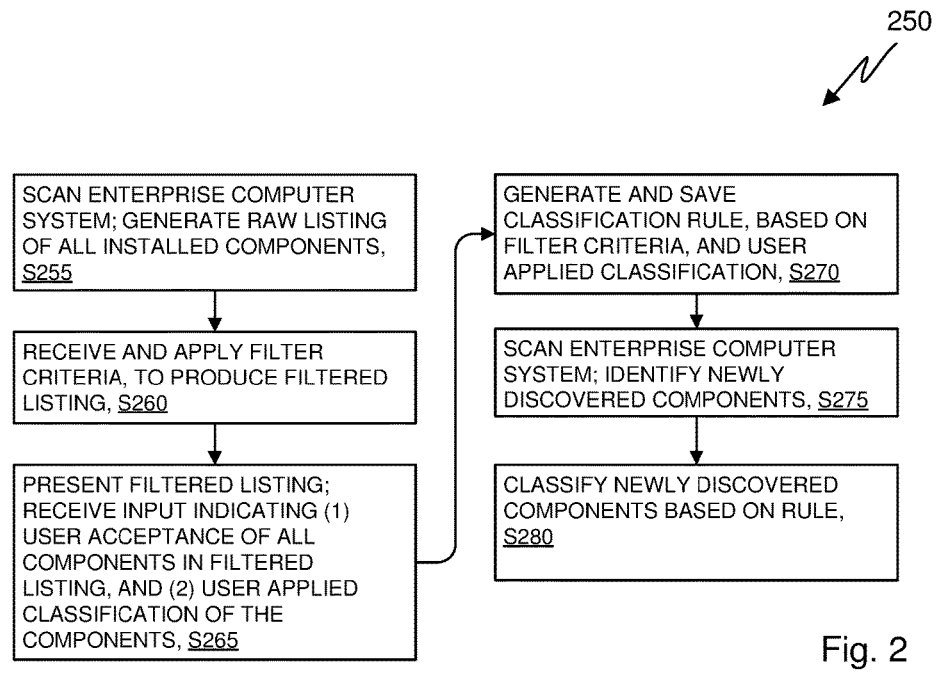
FIG. 2 is a flowchart showing a method performed, at least in part, in accordance with at least one embodiment of the present invention.
Figure 3:
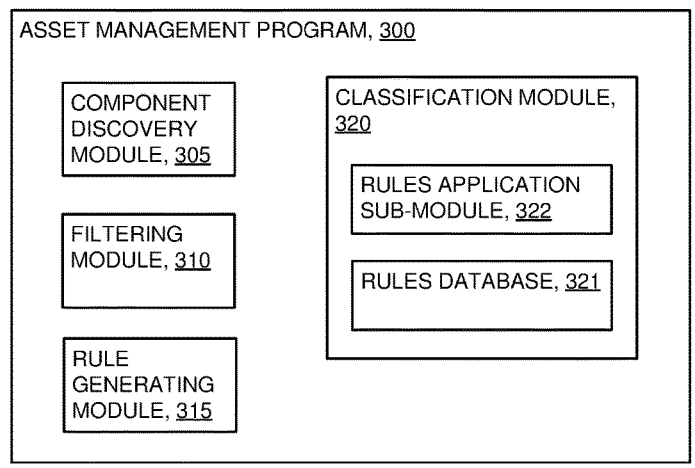
FIG. 3 is a block diagram showing a machine logic (for example, software) portion of a system in accordance with at least one embodiment of the present invention.

FIG. 2 shows flowchart 250 depicting a method according to the present invention. FIG. 3 shows asset management program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where component discovery module 305 of asset management program 300 scans enterprise computer system 104 (see FIG. 1) and generates a raw listing, sometimes herein referred to as an inventory listing, of software components (programs, applications, software modules, etc.) that are installed (licensed, authorized, instantiated, etc.) thereon. In some embodiments of the present invention, the enterprise computer system includes some, or all computer systems within the responsibility and/or ownership of an enterprise, including virtual machine instances or standalone computing systems, operating on physical computing system hardware, mobile devices (smart phones, tablets, etc.) and/or any other computing systems including "internet of things" devices.

Processing proceeds to operation S260, where filtering module 310 of asset management program 300 receives filtering criteria (not shown in the Figures). The filtering criteria may be, for example, generated by machine logic, or supplied from a user interface. The filtering module applies the filtering criteria to the raw listing of software components, to generate a filtered listing (a sub-set of the raw listing). In some embodiments, filtering criteria include one or more of the following characteristics: (i) hostname (host01); (ii) operating system type (Linux); (iii) belonging to group(s) of computers (cluster 01, cluster02); (iv) software component name (widgetApp); (v) software component version (Ver 2.1); (vi) installation path (AdminComp/ host01/applications/widgets/); and/or (vii) computer owner (Administrator), etc.

Processing proceeds at operation S265, where rule generating module 315, of asset management program 300, receives the filtered listing, and presents the filtered listing on a user interface (for example, I/O interface set 206, of server computer 200 or server sub-system 102, of networked computers system 100, see FIG. 1). The rule generating module receives from the user interface, user input indicating: (i) user acceptance of all the components of the filtered listing; and/or (ii) a classification applied to the all components listed in the filtered listing, where the classification may be applied by the user, or may be generated by machine logic (for example, an automated system), or some combination of user input and input generated by machine logic.

Processing proceeds at operation S270, where rule generating module 315 generates a software classification rule based on: (i) characteristics that all components in the filtered listing share in common; and (ii) the user (and/or machine logic generated) classification of the components. This may mean, for example, that the classification rule is based, at least in part, on the filtering criteria that produced the filtered listing. Once generated, the rule generating module registers the classification rule, and stores the classification rule in rules database 321 of (or accessible by) classification module 320 of asset management program 300.

In one embodiment, based on the example filtering criteria given in operation S260 above, rule generating module 315 generates a pseudo-software-classification-rule as follows:

rule01={
For any software component, where {
OS.type="Linux";
computer.hostname="host01"
computer.group="cluster01";
component.name="widgetApp";
component.version <="2.1";
install.path="AdminComp/host01/applications/widgets/";
owner="Administrator";
and classifiedFlag="0"
}
action={
set classification="apply license-ABC";
set classifiedFlag="1";
}
}

Processing proceeds at operation S275, where component discovery module 305, of asset management program 300, periodically or continuously scans (on an ongoing basis) computers included in enterprise computer system 104. During the scans, component discovery module identifies any software components not already classified, to produce a list of unclassified software components, sometimes herein referred to as newly discovered software components.

Processing proceeds at operation S280, where classification module 320, applies rules stored in rules database 321 against each software component listed in the list of unclassified software components. For each unclassified software component that meets the criteria of any rule (for example rule01 above) the rule triggers (invokes, or causes invocation of) actions defined in the rule. In the present example, if a future scan picks up an unclassified component that meets the conditions specified in rule01, rules application sub-module performs the following actions with respect to the component: (i) apply license-ABC to the component; and (ii) set the classifiedFlag to "1". Moreover, a rule may overwrite existing classification(s), if for example, an overwrite flag is set. Further, rules are ranked (ordered) such that, for components to which multiple rules apply, the rules are applied in a predefined order. See, section III (Further Comments and/or Embodiments) below, for more details.

In some embodiments of the present invention, if a user discovers that a classification is not correct, the user can examine and modify one or more rules, and/or modify the order in which the rules are applied, so that the classification is correct. On a subsequent scan, the modified rules are applied, which may result in re-classifying any components that may have been affected by the modification of the rules.

III. FURTHER COMMENTS AND/OR EMBODIMENTS

In software asset and license management, it is generally necessary to classify discovered software components to product offerings as well as assign license metrics under which these offerings should be tracked. Software component structure is often complex, and there typically are many shared components which may be part of many offerings. Manual classification of software components is often a difficult and time consuming endeavor. Moreover, software classification is a continuous process to make sure ongoing changes in the environment (such as new deployments) are properly captured (discovered or identified) and classified.

Some embodiments of the present invention automate the above process based on user-determined filtering criteria, and rules automatically generated based on the filtering criteria, which can be defined in an environment-specific way, for example, by receiving user input indicating 'select all' with respect to a pre-filtered inventory view, to define a new classification rule.

Some embodiments of the present invention use manual user actions to classify software and establish rules which are subsequently and automatically applied in the future. A user applies sophisticated filtering to list particular components which should be collectively classified in some common way, for example: (i) be assigned to an offering; (ii) create a license metric; (iii) be excluded from licensing considerations; and/or (iv) perform any other classifying action. When performing the classification, the user indicates that this action should be done automatically in the future for any new instances meeting (matching) the filtering conditions.

Some embodiments of the present invention may recognize one, or more, of the following facts, potential problems, and/or potential areas for improvement with respect to the current state of the art: (i) correct classification of discovered software is one of the most challenging tasks in software asset management; (ii) computing environments sometimes deal with hundreds of licensing metrics and very complex and distributed components structured for software offerings; (iii) classification performed during deployment phase (for example by using international standards organization (ISO) tagging as described in ISO/IEC 19770-3 standard), may be hindered because inventory administrators are oftentimes unaware of the purpose of software being deployed (for example, with respect to databases or common agents) and therefore may be unable to perform correct classifications; (iv) determining, and embedding in a software asset manager (SAM), predefined classification rules for a product is extremely difficult, as such rules are rarely sufficient to achieve the final result (proper classification) as the rules are generally not generic, but rather specific to a customer computing environment.

Some embodiments of the present invention define customized rules based on manual user activities undertaken when performing the classification.

In some embodiments of the present invention, software classification is achieved by:

1. A user is presented a flat list of discovered software components.

2. The user defines a filter that limits the flat list to a set of instances which should be classified in a common way. The filtering accurately visualizes any environment specifics and is based on various properties such as hostname, operating system type, belonging to groups of computers, software component name and/or version, installation path, computer owner, etc.

3. The user selects (for example, by entering Ctrl-A in some embodiments) all the entries from the pre-filtered set and classifies them in a common way indicating that this classification, from that time forward, constitutes a new generic rule in the environment, for all the software components potentially discovered in the future and matching the specified filter.

4. Each rule further contains an "overwrite flag" (may also be referred to as an "override flag") to indicate whether or not the rule should overwrite (override) a manual classification.

5. The system performs the classification and registers the new rule. The rule is based on conditions defined by the filter, classification action(s), date of rule creation and rule rank (place in the list of rules). (Rule=filter conditions+classification action+date of rule creation+rule rank).

6. When a new component instance is discovered in the environment, the system applies all the rules in a defined order. In some embodiments, the default ordering of the rules is defined based on creation dates (for example, oldest rule to newest). In some embodiments, the user can modify the order by specifying an appropriate rank for each rule.

7. Manual classifications may be overwritten by rules for which an overwrite flag is set.

8. If more than one rule affects the same entries (components), the system applies the rules in a defined order to produce a correct end result (correct classifications). A user can view the list of all registered rules. The user can delete rules, edit rules, and change ranks of the rules, to define the order in which the system applies the rules.

In some embodiments of the present invention, a user can, for example, deploy just one instance (or a few instances) of a component, define the initial classification rules for the instance(s), and then start the rollout of many (perhaps thousands) additional instances. The system automatically and correctly classifies the additional instances based on the initial classification rules, as the rollout progresses.

Some embodiments of the present invention classify a set of software components by: (i) determining the set of software components; (ii) receiving user input comprising one or more filter criteria; (iii) calculating a subset of the set of software components based on the filter criteria; (iv) sending the subset to a user interface device; (v) receiving further user input indicating a selected set of software components, wherein a software component included in the selected set is also included in the subset; (vi) determining that the selected set and the subset are identical; and (vii) in response, storing the filter criteria into a memory device as a classification rule. A classification run comprises applying filter criteria stored into the memory device during a preceding (precedent) classification run. The classification rule comprises precedence information (for example, the "overwrite flag") indicating whether the classification rule is applicable for software components that have already been classified manually. Determining the set of software components comprises scanning a computer system for software components installed thereon.

Some embodiments of the present invention create default, multiple classification rules. With respect to the order of execution of the rules, the latest rule which is applied to a particular item is effectively used. Automated management of a plurality of defaults in a computing environment is based on filtering criteria.

Some embodiments of the present invention may include one, or more, of the following features, characteristics, and/or advantages: (i) ranks custom rules to define the order in which the rules are applied; (ii) a custom rule may overwrite (override) a manual decision; (iii) algorithmically determines the ordering of custom rules application; and/or (iv) requires (for example, in a user interface) a 'select-all' input condition as a prerequisite for creating a custom rule from a pre-filtered inventory view (a pre-filtered list of particular components which should be collectively classified in some common way).

Some embodiments may not have potential advantages disclosed herein, and these potential advantages are not necessarily required of all embodiments.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for classifying software components comprising:
   conducting a first scan of a computer system to determine a first inventory listing of software components installed in the computer system;
   receiving, from a data channel a first filter criterion;
   filtering the first inventory listing in accordance with the first filter criterion to determine a filtered inventory listing of software components: sending the filtered inventory listing to the data channel;
   receiving, from the data channel: (i) information indicating user acceptance of the filtered inventory listing, and (ii) a user classification applied to the software components in the filtered inventory listing;
   generating a classification rule based on a combination of: (i) a characteristic shared in common by the software components of the filtered inventory listing, and (ii) the user classification;
   storing into a memory device, the classification rule;
   conducting a second scan of the computer system to determine a second inventory listing comprising an unclassified software component installed in the computer system;
   determining the unclassified software component meets a condition specified in the classification rule; and
   in response to determining the unclassified software component meets a condition specified in the classification rule, invoking an action specified in the classification rule;
   wherein the action specified in the classification rule comprises:
      applying a license to the unclassified software component;
      assigning, to the unclassified software component, a license metric for tracking usage of the unclassified software component;
      setting a Boolean flag corresponding to a classification status of the unclassified software component; and
      overwriting a pre-existing classification.

2. The method of claim 1, wherein the classification rule comprises an overwrite flag that indicates whether the classification rule is applicable for software components that have already been classified.

3. The method of claim 1, wherein the first classification scan and the second classification scan comprise scanning a computer system for software components installed thereon.

4. The method of claim 1, wherein the data channel comprises a user interface.

5. The method of claim 1, wherein the classification rule specifies a software characteristic selected from the group consisting of: (i) operating system type; (ii) computer hostname; (iii) computer group name; (iv) software component name; (v) software component version number; (vi) software component installation path; (vii) software component owner name; and (viii) classified flag Boolean.

6. A computer program product comprising:
   one or more computer readable storage media and program instructions stored on the one or more computer readable storage media, the program instructions comprising instructions to perform:
      receiving, from a data channel a first filter criterion;
      conducting a first scan of a computer system to determine a first inventory listing of software components installed in the computer system that meet the first filter criterion;
      filtering the first inventory listing in accordance with the first filter criterion to determine a filtered inventory listing of software components: sending the filtered inventory listing to the data channel;
      receiving, from the data channel: (i) information indicating user acceptance of the filtered inventory listing, and (ii) a user classification applied to the software components in the filtered inventory listing: generating a classification rule based on a combination of: (i) a characteristic shared in common by the software components of the filtered inventory listing, and (ii) the user classification:
      storing into a memory device, the classification rule;
      conducting a second scan of the computer system to determine a second inventory listing comprising an unclassified software component installed in the computer system;
      determining the unclassified software component meets a condition specified in the classification rule; and
      in response to determining the unclassified software component meets a condition specified in the classification rule, invoking an action specified in the classification rule;
      wherein the action specified in the classification rule comprises:
         applying a license to the unclassified software component;
         assigning, to the unclassified software component, a license metric for tracking usage of the unclassified software component:
         setting a Boolean flag corresponding to a classification status of the unclassified software component; and
         overwriting a pre-existing classification.

7. The computer program product of claim 6, wherein the classification rule comprises an overwrite flag that indicates whether the classification rule is applicable for software components that have already been classified.

8. The computer program product of claim 6, wherein the first classification scan and the second classification scan comprise scanning a computer system for software components installed thereon.

9. The computer program product of claim 6, wherein the data channel comprises a user interface.

10. The computer program product of claim 6, wherein the classification rule specifies a software characteristic selected from the group consisting of: (i) operating system type; (ii) computer hostname; (iii) computer group name; (iv) software component name; (v) software component version number; (vi) software component installation path; (vii) software component owner name; and (viii) classified flag Boolean.

11. A computer system comprising:
one or more computer processors;
one or more computer-readable storage media;
program instructions stored on the computer-readable storage media for execution by at least one of the one or more processors, the program instructions comprising instructions to perform:
receiving, from a data channel a first filter criterion;
conducting a first scan of a computer system to determine a first inventory listing of software components installed in the computer system that meet the first filter criterion;
filtering the first inventory listing in accordance with the first filter criterion to determine a filtered inventory listing of software components: sending the filtered inventory listing to the data channel;
receiving, from the data channel: (i) information indicating user acceptance of the filtered inventory listing, and (ii) a user classification applied to the software components in the filtered inventory listing: generating a classification rule based on a combination of: (i) a characteristic shared in common by the software components of the filtered inventory listing, and (ii) the user classification;
storing into a memory device, the classification rule;
conducting a second scan of the computer system to determine a second inventory listing comprising an unclassified software component installed in the computer system;
determining the unclassified software component meets a condition specified in the classification rule; and
in response to determining the unclassified software component meets a condition specified in the classification rule, invoking an action specified in the classification rule;
wherein the action specified in the classification rule comprises:
applying a license to the unclassified software component;
assigning, to the unclassified software component, a license metric for tracking usage of the unclassified software component;
setting a Boolean flag corresponding to a classification status of the unclassified software component; and
overwriting a pre-existing classification.

12. The computer system of claim 11, wherein the classification rule comprises an overwrite flag that indicates whether the classification rule is applicable for software components that have already been classified.

13. The computer system of claim 11, wherein the first classification scan and the second classification scan comprise scanning a computer system for software components installed thereon.

14. The computer system of claim 11, wherein the data channel comprises a user interface.

15. The computer system of claim 11, wherein the classification rule specifies a software characteristic selected from the group consisting of: (i) operating system type; (ii) computer hostname; (iii) computer group name; (iv) software component name; (v) software component version number; (vi) software component installation path; (vii) software component owner name; and (viii) classified flag Boolean.

* * * * *